Patented Sept. 13, 1932

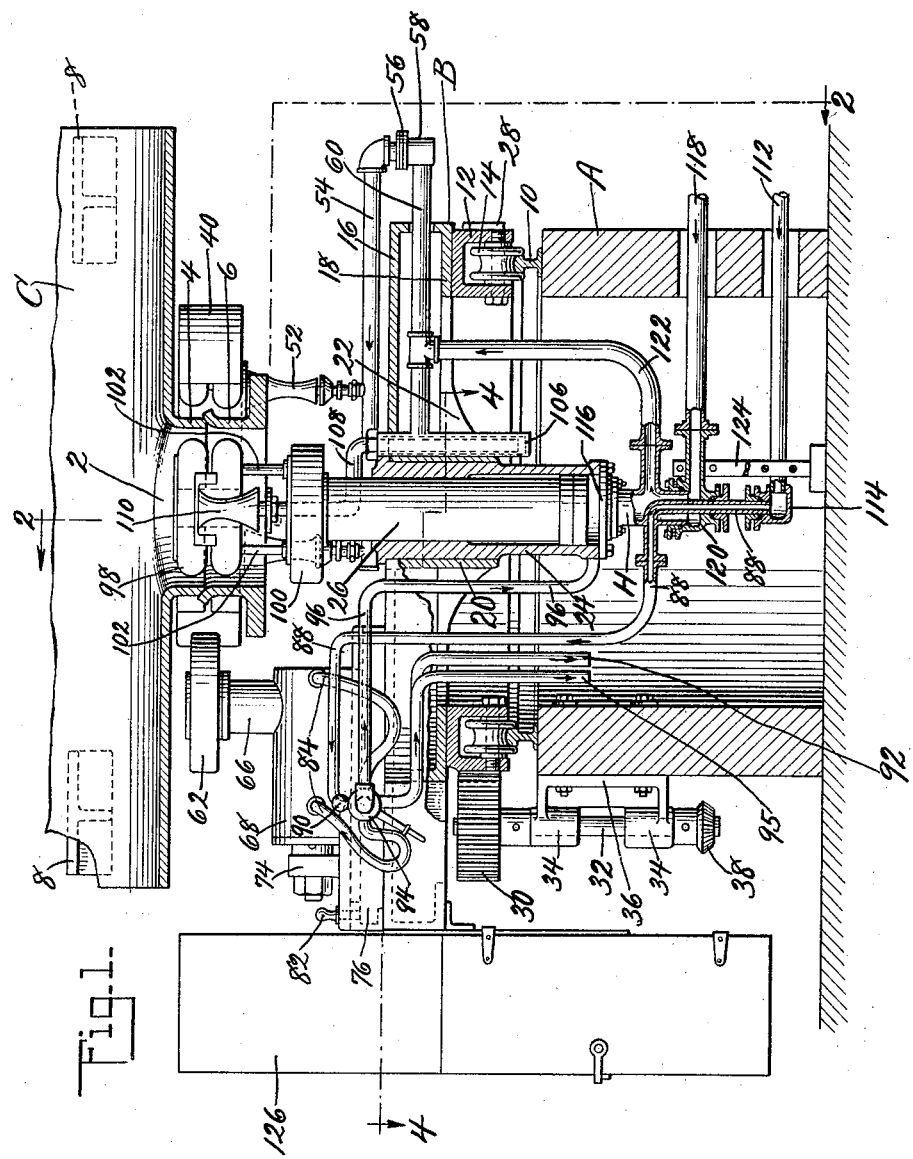

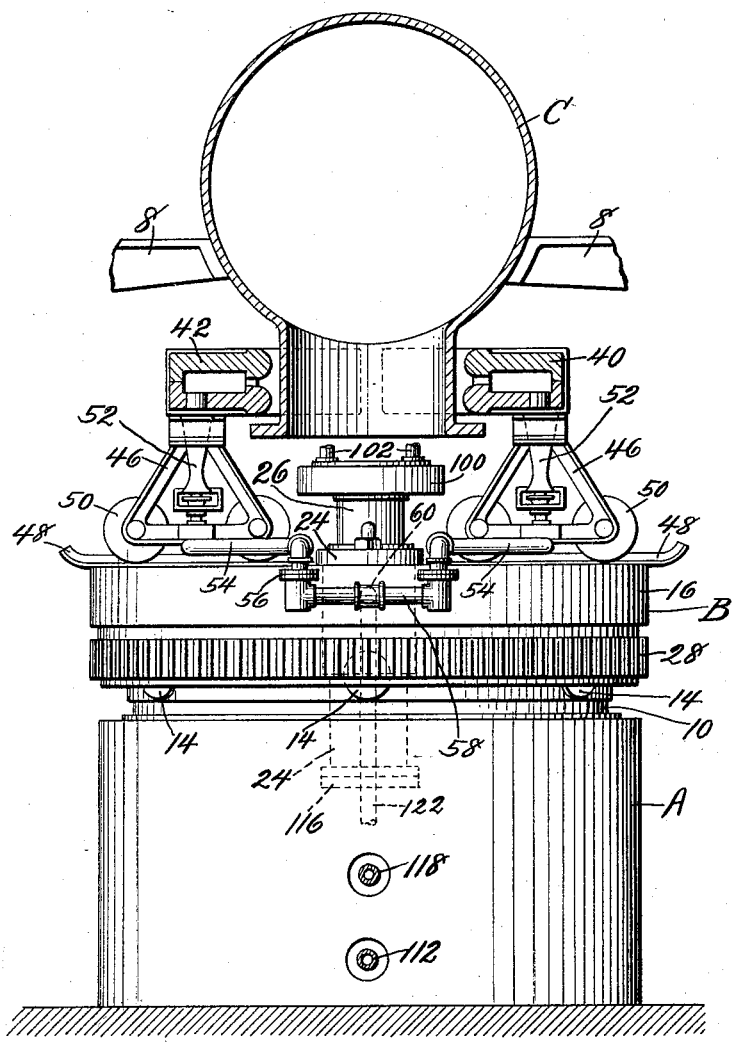

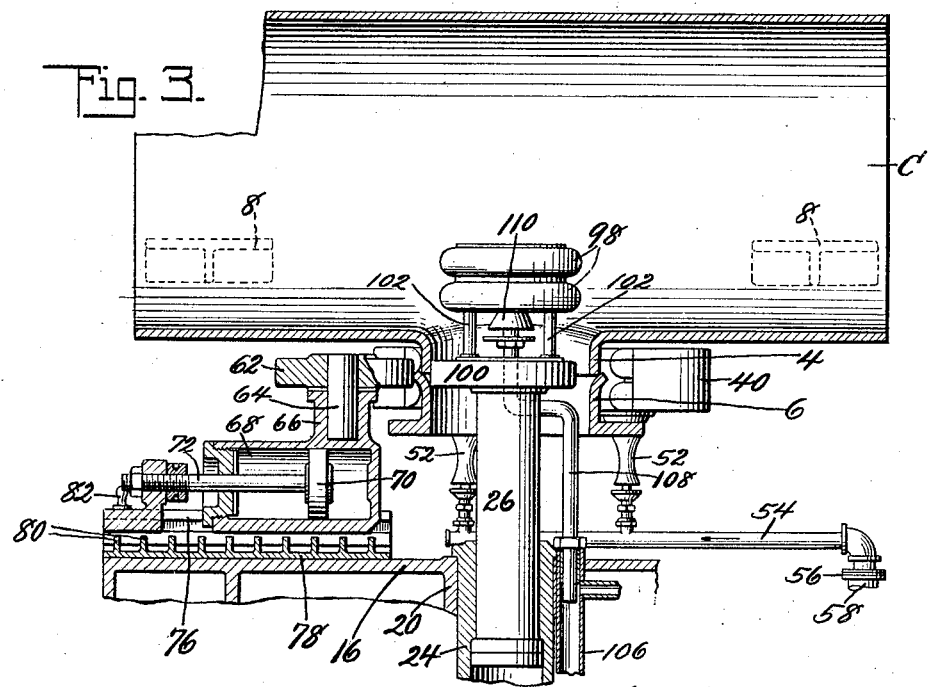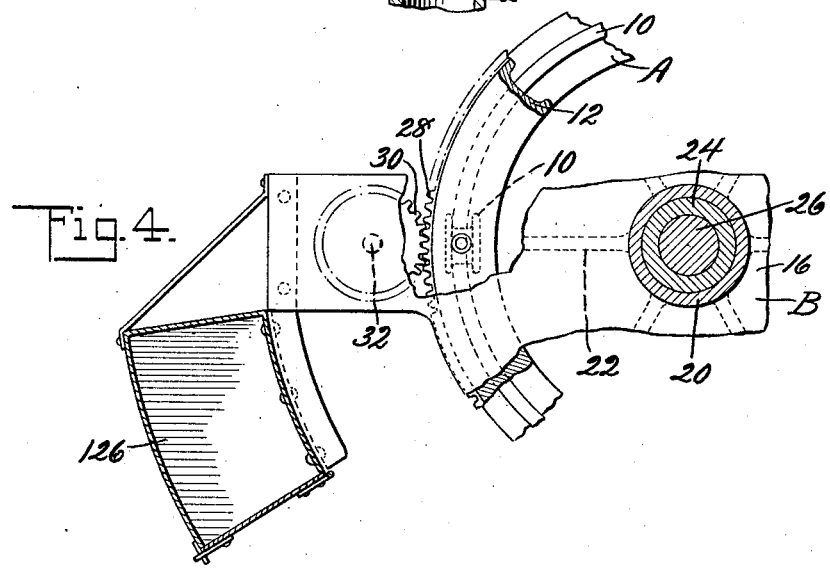

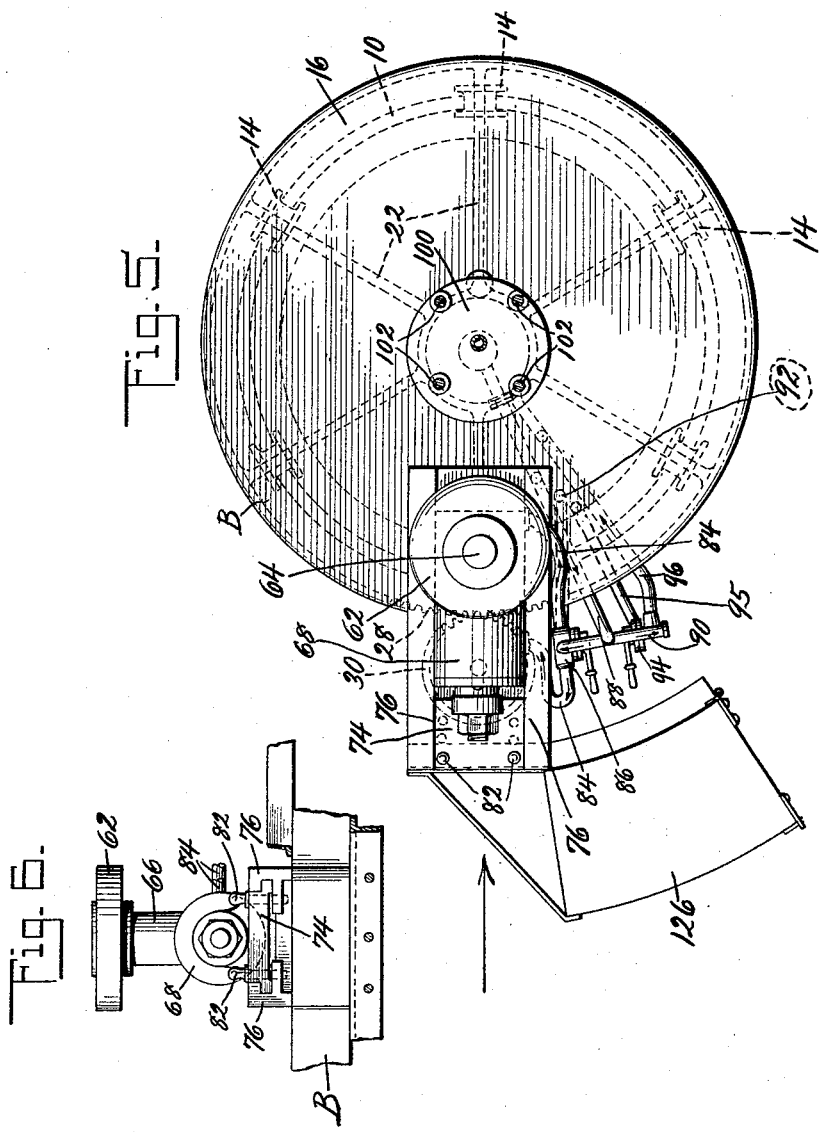

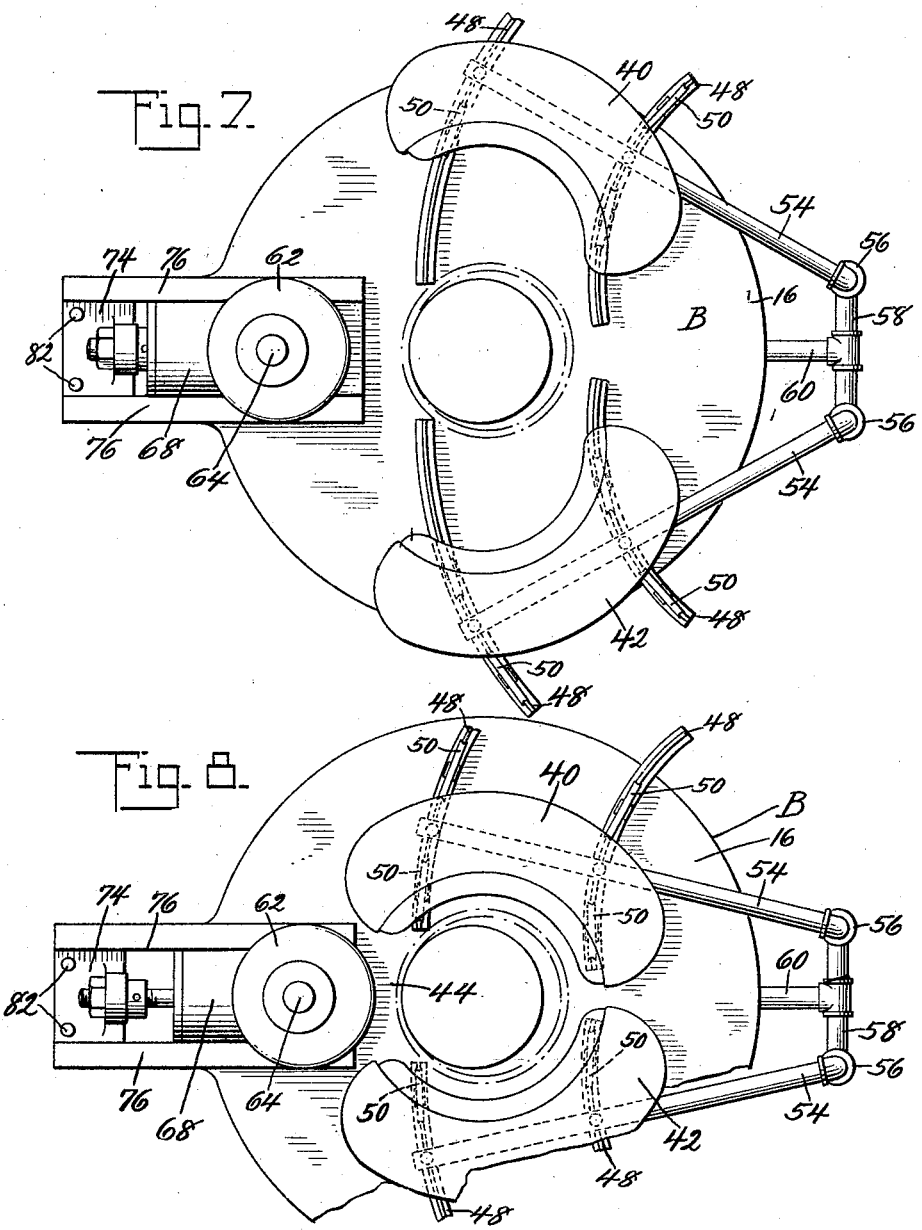

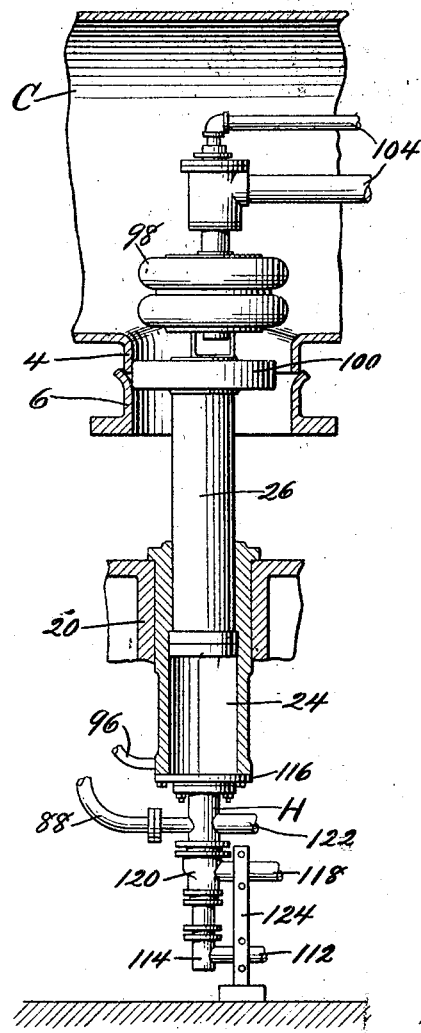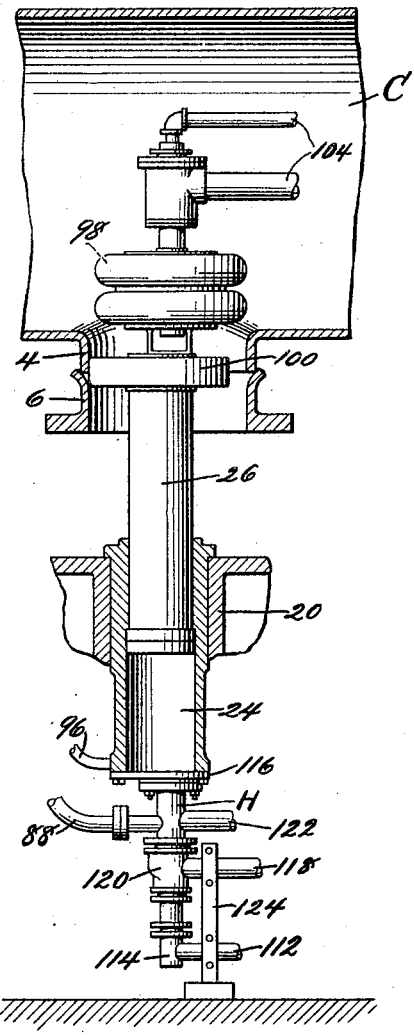

1,876,762

UNITED STATES PATENT OFFICE

CHARLES L. ROWLAND, DECEASED, LATE A RESIDENT OF CARBONDALE, PENNSYLVANIA; BY KATHRYN E. ROWLAND, EXECUTRIX, OF CARBONDALE, PENNSYLVANIA, AND EDWARD A. DE LANEY, EXECUTOR, OF CARBONDALE, PENNSYLVANIA, ASSIGNORS TO AMERICAN WELDING COMPANY, OF CARBONDALE, PENNSYLVANIA, A CORPORATION OF DELAWARE

WELDING APPARATUS

Original application filed January 27, 1926, Serial No. 84,134. Divided and this application filed April 29, 1930. Serial No. 448,252.

This invention relates to a welding apparatus and has for one object the production of means for welding a branch or neck onto a pipe or tank, though the invention is adapted for welding work in fields other than those pertaining to pipes or tanks.

This application is a division of copending application Serial No. 84,134, filed January 27, 1926, and contemplates certain improvements in welding apparatus.

It is an object of the present invention to provide a welding machine having exterior and interior welding members which are rotatable around a fixed piece of work to effect welding thereof, or which are rotatable around fixed pieces of work to be welded together.

Another object of this invention is the provision of a welding machine having exterior and interior welding members adapted to engage work to be welded, with transmission means to effect relative movement between the welding members and the work.

A further object of this invention is the provision of means for actuating welding members of a welding machine to a position to effect welding of a piece of work.

A still further object of this invention is the provision of a complete and unitary machine for first heating parts to be welded together and then actuating exterior and interior welding members to a welding position.

Other objects and advantages of this invention will be apparent from the following description taken with the accompanying drawings in which:

Fig. 1 is a view partly in section and partly in side elevation showing the apparatus of the present invention.

Fig. 2 is a partial sectional view taken on the line 2—2, Fig. 1.

Fig. 3 is a fragmentary view of some of the parts shown in Fig. 1, but with the elements in a different position.

Fig. 4 is a sectional view on the line 4—4, Fig. 1.

Fig. 5 is a top plan view of the apparatus with the furnaces removed.

Fig. 6 is an end view of the exterior welding member and its mounting, the view being taken in the direction of the arrow shown in Fig. 5.

Figs. 7 and 8 are top plan views of the apparatus showing the exterior furnaces in two different positions, and Figs. 9 and 10 are fragmentary vertical sectional views through the center of the apparatus showing modified forms of the invention.

Referring now more particularly to the drawings, the apparatus of the present invention includes a base indicated generally at A and a turret indicated generally at B; which turret is rotatable on the base A and comprises in effect, a carrier for the furnace equipment and the welding means both of which being more fully described hereinafter.

The apparatus of the present invention is shown as welding a neck onto a piece of work C which is indicated in the present instance as a portion of a tank having a manhole opening 2 surrounded by a flange 4 to which a neck 6 is to be welded. The work C is supported on a work support 8 of any suitable or desired character and, during the operation of welding, the neck 6 is temporarily supported in any desired manner.

The base A is shown as being cylindrical but this is merely by way of example, and secured to the upper edge of said base is a circular track 10 on which the turret B rotates, the latter comprising a turret base 12 of channel form between the flanges of which the rollers 14 are journaled; the rollers riding on the circular track 10. The turret B includes a top 16 having a base 18 in the form of an annular flange which rests upon and is preferably secured to the circular channel 12. The top 16 of the turret is provided with an internally depending flange 20, reinforced by stiffening ribs 22 and defining a guide or positioning member for the cylinder 24 of a pneumatic lift having a ram 26.

The turret is rotatable on the base A as before mentioned, and the turret base 12 has a ring gear 28 secured to the outer surface thereof which is engaged by a pinion 30 at the end of a shaft 32 carried in bearings 34 forming parts of a bracket 36 which is secured to the base A. For rotating the shaft 32 and hence the pinion 30 and ring gear 28, a pinion 38 is keyed to the lower end of the shaft 32 and is driven from any suitable source of power.

As before mentioned, the work on which the particular apparatus shown is capable of acting is here selected as a tank, to which the neck 6 is to be secured to the flange 4. In the present instance both the exterior and interior surfaces of the work have welding heat and pressure applied thereto.

Suitable exterior furnace equipment is provided which in the instance shown comprises traveling furnaces 40 and 42 respectively (see Figs. 7 and 8) which are preferably segmental in shape and which when in heat applying position as shown in Fig. 8 substantially surround the work but leave an intervening gap 44. These furnaces are mounted on carriages 46 that travel on curved tracks 48; the carriages having the rollers 50, and the tracks being mounted or secured to the turret top 16.

Nozzles 52 supply fuel to these exterior furnaces 40 and 42 and these nozzles receive fuel from pipes 54 which are connected as at 56 to a header 58 which receives fuel from a pipe 60. To permit movement of the furnaces toward and away from the work, the connections of the pipes 54 with the header 58 are flexible or jointed.

In the plane of the gap 44 an exterior welding member 62 is mounted; the member 62 comprising a roller mounted for rotation on a shaft 64 carried in a stud 66 at one end of a cylinder 68. The cylinder has a piston 70 therein secured to the end of a piston rod 72 which latter is secured to a slide 74 which moves in guides 76 secured to the turret top. Arranged between the guides 76 and supported on the turret top 16 is a plate 78 having a plurality of spaced upstanding flanges 80 between which the lower ends of pins 82 may extend to position the slide 74 and hence the piston 70 with respect to the cylinder 68. The cylinder 68 may be of any preferred construction and is mounted for sliding movement in the guides 76. It will be apparent that when fluid under pressure is admitted to the cylinder on either side of the piston 70 the cylinder is actuated to move radially of the turret top and thus urge the roll 62 toward or away from the work, and to admit this fluid under pressure, hose connections 84 extend to each end of the cylinder (see Fig. 5) and have their opposite ends connected to a 4-way valve 86 which receives fluid under pressure from a main intake pipe 88 from which said fluid passes into a header 90 to be delivered to the valve 86. Extending from the valve 86 as shown clearly in Figs. 1 and 5 is an exhaust pipe 92 which is adapted to discharge fluid under pressure from one end of the cylinder when fluid under pressure is admitted to the opposite end of the cylinder.

The header 90 is also connected to a valve 94 to which latter a feed pipe 96 is connected which has its opposite end connected to the interior of the cylinder 24 whereby to admit fuel under pressure beneath the ram 26. The valve 94 is provided with an exhaust pipe 95 to permit discharge of fluid from pipe 96 upon descent of the ram 26.

For heating the interior surface of the work, a traveling furnace indicated at 98 is provided and in the instance shown in Fig. 1, and also in Figs. 9 and 10, this furnace 98 is supported by an interior welding tool 100; the latter being in the form of a roll mounted on the upper end of the ram 26. The roll 100 may be so mounted as to rotate with respect to the ram 26 or it may be fixed with respect thereto and, in the instance shown in Fig. 1, the furnace 98 is supported by studs 102.

It is important that the heat should be applied to the interior surface of the work substantially equally, but it will also be understood that the interior welding member 100 should contact with the work at only one point, viz., a point opposite the point of contact of the exterior welding member 62. The welding member 100 therefore is eccentrically disposed with respect to the work and this may be done by mounting said welding member eccentrically with respect to the center or rotation of the turret B. The roll also may be mounted eccentrically with respect to the ram 26 as shown in the present drawings. The interior furnace 98 need not be carried by the interior welding member 100 and need not rotate, but if carried by said member 100 it is preferably concentrically disposed with respect to the interior surface of the work in order that heat may be uniformly applied throughout the entire interior circumference of the work.

In Figs. 9 and 10 are shown modified forms of the invention. In Fig. 9 the welding member 100 is concentric with the ram 26 and consequently the furnace 98 is eccentric with respect to the welding member 100, while in Fig. 10 substantially the same arrangement is shown as is present in Fig. 9 with the exception that the distributor heads H (hereinafter described) are arranged eccentric with respect to the ram 26 but in line with the furnace 98. Figs. 9 and 10 also show the fuel connections as extending into the furnace from above, they being indicated at 104 but this is merely a variation of the preferred construction now to be described.

For supplying fuel to the interior furnace 98, the pipe 60 extends to a cylinder 106 which telescopically receives the lower end of a fuel pipe 108 the upper end of which latter is connected to a nozzle 110 for feeding the furnace 98.

The fuel and fluid pressure may conveniently be brought into the apparatus by the following means. A main water pipe 112 is shown which extends through the base A and into a distributor head 114 into which latter the lower end of main intake pipe 88 extends and with respect to which it may be rotated. The main intake pipe extends upwardly through the distributor head H hereinbefore mentioned secured to the end closure 116 of the cylinder 24. 118 indicates a fuel pipe which leads to a distributor head 120 secured to the lower end of distributor H and into which latter fuel from the pipe 118 may pass and from which said fuel may pass into a pipe 122 which is connected to the pipe 60.

The pipes 112 and 118 are supported by a bracket 124 and the pipe 88 and distributor H is rotatable with respect to the heads 114 and 120 as will be apparent. In view of this arrangement, it is believed apparent that those skilled in the art will recognize that the turret B may be rotated with the furnaces and the fuel and fluid connections, on the base A.

Carried by the turret in any suitable or desired manner is an operator's cage 126 in such a position that the levers for controlling the valves 86 and 94 are easily accessible.

The operation of the device of the present invention is believed to be clear. The work to be acted upon is placed in position on the work holder and the neck 6 is temporarily supported in any suitable manner. The welding members 62 and 100 are withdrawn by actuating the valves 86 and 94 in an obvious manner, and the furnaces are then ignited and placed in position. Rotation is then imparted to the turret B thus rotating the furnaces with respect to the work and heating the work at the meeting edges which are to be welded. When the joint to be welded has been heated a sufficient amount, the valve 86 is actuated to admit fluid under pressure to the cylinder 68 whereby to urge the welding roll 62 to the position shown in Fig. 3 in the gap 44 between the exterior furnaces 40 and 42. The valve 94 is also actuated at this time to admit fluid under pressure beneath the ram 26 to elevate the latter to a position such that the welding roll 100 engages the work in a manner shown in Fig. 3, and it is apparent that a continued rotation of the turret will cause the welding rolls 62 and 100 to weld the neck 6 to the flange 4 of the tank C. The rolling and heating action is continued until a complete weld has been effected whereupon the rollers are then withdrawn and the furnaces extinguished. Rotation of the turret is stopped of course and the exterior furnaces are swung away from the work to the position shown in Fig. 7 whereupon the work may be removed from its support.

From the above description it is believed that the construction and operation of the apparatus of the present invention will be fully apparent to those skilled in the art but it is to be understood that the drawings herein are for illustrative purposes only and various changes may be made in the structure disclosed and within the spirit of the invention without departing from the scope of the appended claims.

What is claimed is:

1. In a welding apparatus, a rotatable turret, a pneumatic lift carried by said turret, and a welding member carried by the lift and eccentrically disposed with respect to the center of rotation of the turret.

2. A welding machine including a work holder for hollow work, a base, a turret rotatable on the base, a pneumatic lift carried by the turret, an interior welding member actuated by the lift to be extended into the hollow work, an exterior welding member mounted on the turret and movable radially thereon to engage the work at a point in line with the interior welding member when the latter is in elevated position, a header receiving fluid under pressure, a cylinder for carrying the exterior welding member and receiving fluid from the header, means extending from the header to conduct fluid under pressure to the lift for elevating the interior welding member, and means for controlling the exhaust of fluid from the cylinder and lift to withdraw the welding members from the work.

3. In a welding machine, a work holder, a base, a turret rotatable on the base, an exterior welding member, a cylinder to which the exterior welding member is connected, a piston supported on the turret and arranged in the cylinder, means for retaining the piston in a predetermined adjusted position with respect to the cylinder, and means for admitting fluid under pressure to the cylinder to actuate the latter whereby to move the same into or away from contact with the work.

4. In a welding machine, a work holder, a base, a turret rotatable on the base, an exterior welding member, a cylinder to which the exterior welding member is connected, a piston supported on the turret and arranged in the cylinder, means for retaining the piston in a predetermined adjusted position with respect to the cylinder, means for admitting fluid under pressure to the cylinder to actuate the latter whereby to move the same into or away from contact with the work, and transmission devices for effecting rotation of the turret and welding member around the work.

5. In a welding machine, a work holder for hollow work, a base, a turret rotatable on the base, guides secured to the turret, a slide adjustable in said guides and having a piston secured thereto, a cylinder slidably mounted in the guides and having a welding member carried thereby, and means for admitting fluid under pressure to the cylinder to actuate the latter whereby to urge the welding member into engagement with or away from the work.

In witness whereof we have hereunto set our hands.

KATHRYN E. ROWLAND,
*Executrix*,
EDWARD A. DE LANEY,
*Executor*,
of Charles L. Rowland, Deceased.